United States Patent [19]
Williamson

[11] Patent Number: 5,124,990
[45] Date of Patent: Jun. 23, 1992

[54] DIAGNOSTIC HARDWARE FOR SERIAL DATALINK

[75] Inventor: Gregory L. Williamson, Peoria, Ill.

[73] Assignee: Caterpillar Inc., Peoria, Ill.

[21] Appl. No.: 520,437

[22] Filed: May 8, 1990

[51] Int. Cl.$^5$ .............................................. G06F 11/00
[52] U.S. Cl. ................................. 371/20.6; 340/650; 371/20.1
[58] Field of Search .................. 371/20.6, 20.1, 8.2, 371/11.2; 370/13, 14, 15, 16, 16.1, 17, 85.12, 85.15; 375/10; 340/651, 650; 324/541

[56] References Cited

U.S. PATENT DOCUMENTS

| | | | |
|---|---|---|---|
| 4,063,220 | 12/1977 | Metcalfe et al. | 340/147 LP |
| 4,195,351 | 3/1980 | Barner et al. | 364/900 |
| 4,281,380 | 7/1981 | DeMesa et al. | 364/200 |
| 4,398,288 | 8/1983 | Mizokawa et al. | 370/86 |
| 4,527,270 | 7/1985 | Sweeton | 371/11 |
| 4,530,085 | 7/1985 | Hamada et al. | 370/15 |
| 4,760,571 | 7/1988 | Schwarz | 370/86 |
| 4,782,300 | 11/1988 | Bonaccio | 371/11.2 X |
| 4,815,069 | 3/1989 | Nakayashiki et al. | 370/16 |
| 4,907,227 | 3/1990 | Unno | 371/20.6 X |

FOREIGN PATENT DOCUMENTS

0239731 10/1987 European Pat. Off. .

Primary Examiner—Robert W. Beausoliel
Attorney, Agent, or Firm—James R. Yee

[57] ABSTRACT

Full diagnostic capability is provided in a serial datalink network having a plurality of control modules. Each control module includes a differential receiver for providing noise immunity and a transmitter having a positive line driver and a negative line driver. Positive and negative transmission wires connect differential receivers to the positive and negative line drivers. Circuits sense the occurrence of a short circuit condition between the positive transmission wires and ground and between the negative transmission wires and supply voltage. Overcurrents in the positive and negative transmission wires are also detected.

5 Claims, 10 Drawing Sheets

FIG. 1
PRIOR ART

PRIOR ART

DIAGNOSTIC HARDWARE FOR SERIAL DATALINK

DESCRIPTION

1. Technical Field

This invention relates generally to a bidirectional communications network having a ring configuration, and more specifically, to an apparatus for providing fault and noise tolerance capabilities to a serial communications datalink.

2. Background Art

With the use of intelligent control modules on a vehicle (for example, microprocessor-based controllers), a system which provides cost effective and reliable serial communications between such intelligent modules has become increasingly important.

Figure 1:
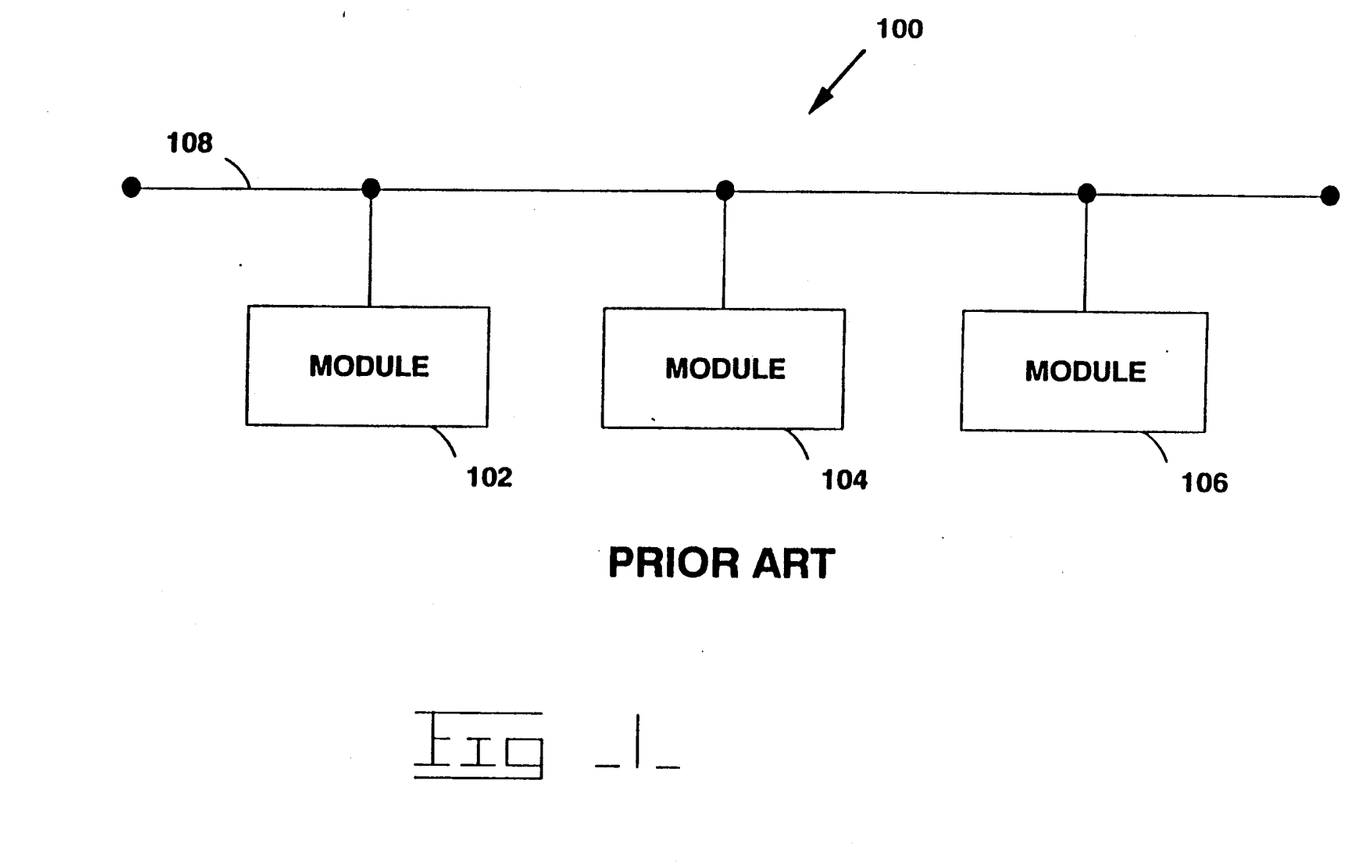
FIG. 1 is a block diagram of a serial bus network as known in the prior art.
Figure 2:
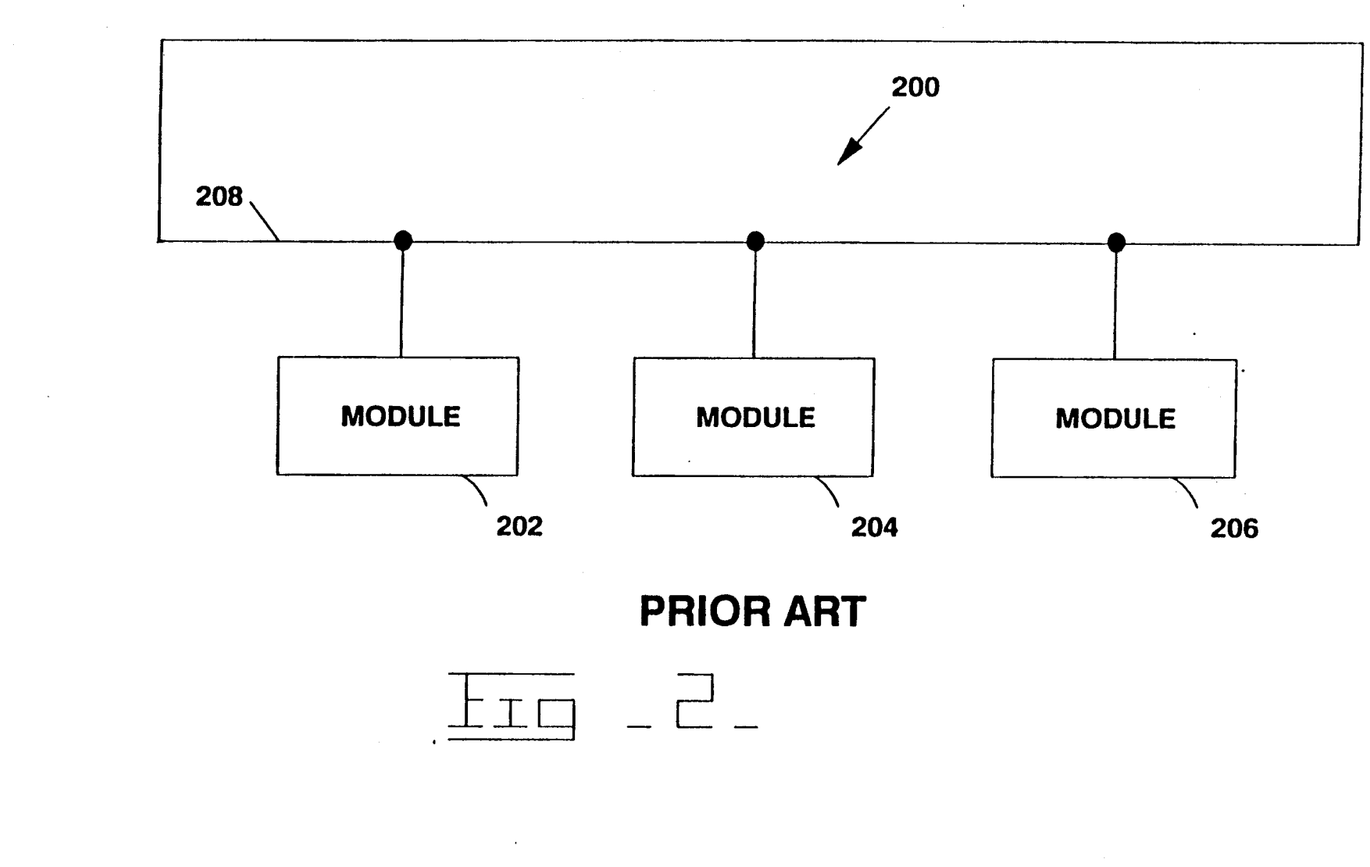
FIG. 2 is a block diagram of a ring bus network as known in the prior art.

There are four basic types of communication networks: the serial bus network, the bus ring network, the general ring network and the bidirectional ring network. In a serial bus network, the modules are connected through a transmission line (or bus). Each module has a transmitter for putting data onto the bus and a receiver for reading data off of the bus. FIG. 1 shows a typical bus network 100. Each module 102,104,106 is connected to a bus 108. In the bus ring network 200, as illustrated in FIG. 2 modules 202, 204, 206 are connected by a bus 208, as in the normal bus network 100 described above, but the bus 208 is in the form of a ring.

Figure 3:
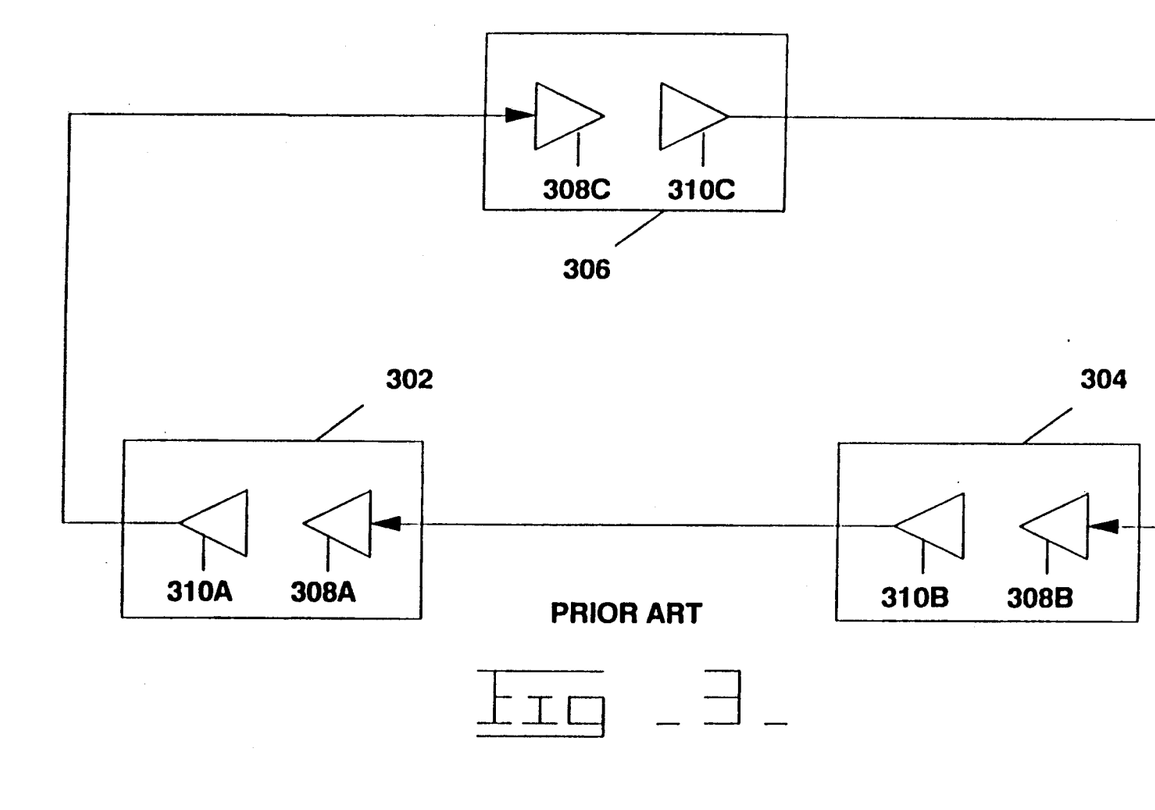
FIG. 3 is a block diagram of a communications network having control modules connected in a ring by a transmitter-receiver pair, as known in the prior art.
Figure 4:
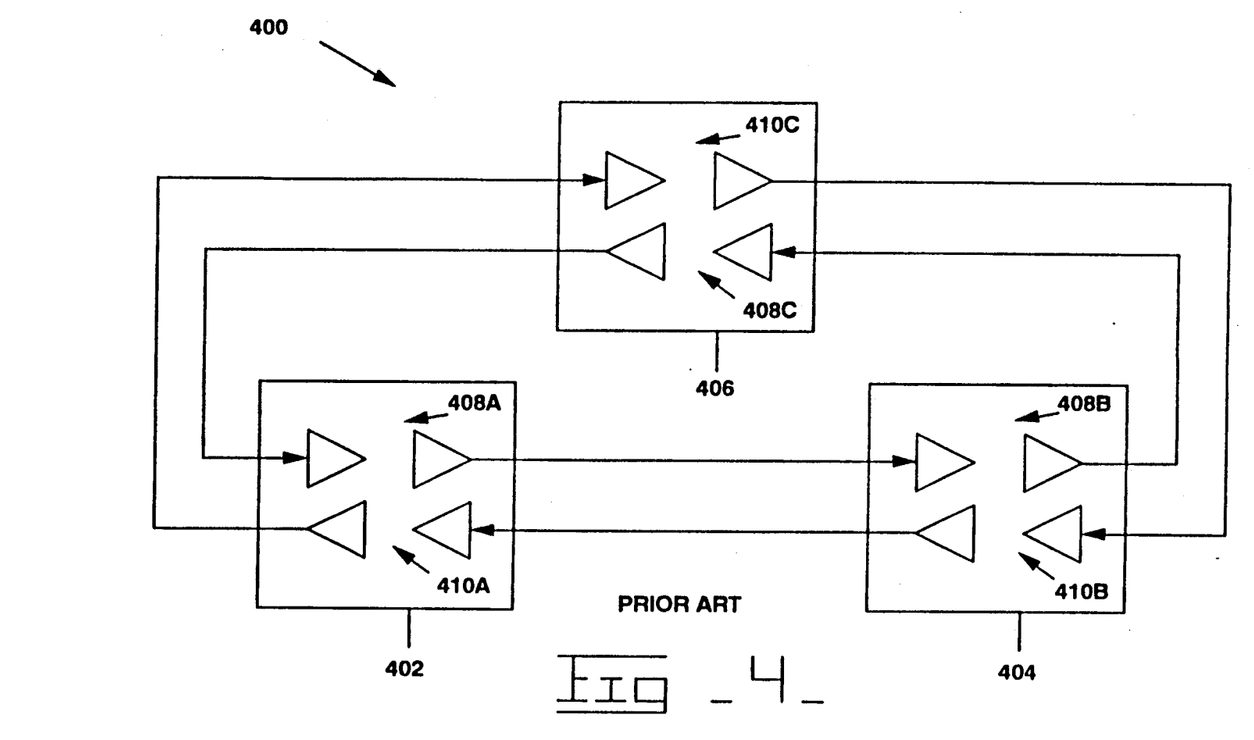
FIG. 4 is a block diagram of a redundant ring network as known in the prior art.

In the general ring configuration, as illustrated by the ring network 300 of FIG. 3, each module 302, 304, 306 is connected to the previous module and to the next module by a separate transmission line. Each module contains a receiver 308A, 308B, 308C for receiving data from the previous module and a transmitter 310A, 310B, 310C for transmitting data to the next module in the ring. This configuration provides unidirectional communication around the ring. As illustrated in FIG. 4, each module 402, 404, 406 in the bidirectional ring network 400 includes two transmitter/receiver pairs 408A, 408B, 408C, 410A, 410B, 410C. One transmitter/receiver pair 408A, 408B, 408C from each control module 402, 404, 406 provides communication around the ring in one direction using one set of transmission lines. The other transmitter/receiver pair 410A, 410B, 410C provides communication in the other direction around the ring using another set of transmission lines. Each set of transmission lines consists of a pair of wires. Data being transmitted over the transmission lines are determined by the voltage differential in the wire pair. This configuration provides bidirectional communication around the ring.

Application of a communication network to intelligent control modules on a vehicle presents several problems. First, communication may be hampered by electromotive and electromagnetic interference. This interference adds noise to the electrical signals being propagated by the transmission lines between the control modules making the data messages indecipherable. The noise may be seen as an offset bias in the electrical signals being transmitted over the wire pair. Each wire in the pair would bear the same offset bias. One common method of determining if a fault has occurred is by comparing the voltage on the wire pairs in a logic circuit If the offset bias becomes large enough (either a large negative offset bias or a large positive offset bias) the logic circuit will not be able to differentiate between the two voltages even though no fault has occurred. This is known as the common mode problem. U.S. Pat. No. 4,760,571 issued Jul. 26, 1988, to Siegfried Schwarz, discloses a ring network. The network includes a noise filter to eliminate electromotive and electromagnetic interference. However, at high data rates, filtering of the data can also affect the integrity of the data messages Second, due to space limitations, the transmission lines are not very accessible. After the occurrence of a fault in the network (i.e., a short circuit or open circuit condition on one of the transmission lines), a manual check of the wiring harness is difficult and time consuming. It is therefore desirable to have a network with full diagnostic capabilities (i.e., giving the location and the type of fault condition).

Third, if a fault does occur, the faulted transmission line(s) needs to be isolated and the associated control module(s) protected.

Fourth, the common mode problem is to be eliminated without comprising any capabilities of the system.

The subject invention is directed at overcoming one or more of the problems as set forth above.

DISCLOSURE OF THE INVENTION

In one aspect of the invention, an apparatus provides fault tolerant serial communications in a network. The network includes a plurality of control modules connected on to another. The network transmits data messages over positive and negative transmission lines. Each control module has an associated differential receiver with positive and negative input terminals and an output terminal. The negative input terminal is connected to a first positive receiving wire, the positive input terminal is connected to a first negative receiving wire, and the output terminal is connected to one control module. The network also includes a transmitter associated with each control module. Each transmitter includes a first positive line driver connected between the one control module and a first positive transmitting wire, and a first negative line driver connected between the one control module and a first negative transmitting wire. The network includes circuits for sensing short circuits between the first positive receiving wire and ground, sensing short circuits between the first negative receiving wire and supply voltage, and for sensing excessive current on the first positive and negative transmitting wires.

In another aspect of the present invention, a method for providing fault tolerant serial communications in a network is provided. The network includes a plurality of control modules connected together. The network is adapted to transmit data messages from one control module to another control module over positive and negative transmission wires. The method includes the steps of transmitting a data message from one control module to another control module over ones of the first positive and negative transmission wires, sensing the current flowing through the first positive and negative transmission wires as a voltage differential between the positive and negative transmission wires, and delivering the data message to the other control module as a function of the voltage differential. The method also includes the steps of sensing a short circuit condition between the positive transmission wire and ground, sensing a short circuit condition between the negative transmission wire and supply voltage, and delivering a first fault signal in response to either of the sensed conditions, sensing the magnitude of current flowing through the positive transmission wire, comparing the positive transmission wire current magnitude to a first reference current value, and delivering a second fault signal in response to the positive transmission wire current magnitude being greater than the first reference current value. The method further includes the steps of sensing the magnitude of current flowing through the negative transmission wire, comparing the negative transmission wire current magnitude to a second reference current value, and delivering a third fault signal in response to the negative transmission wire current magnitude being greater than the second reference current, and receiving the first, second, and third fault signal and isolating the control modules from the positive and negative transmission wires in response to the first, second and third fault signals.

BEST MODE FOR CARRYING OUT THE INVENTION

Figure 5:
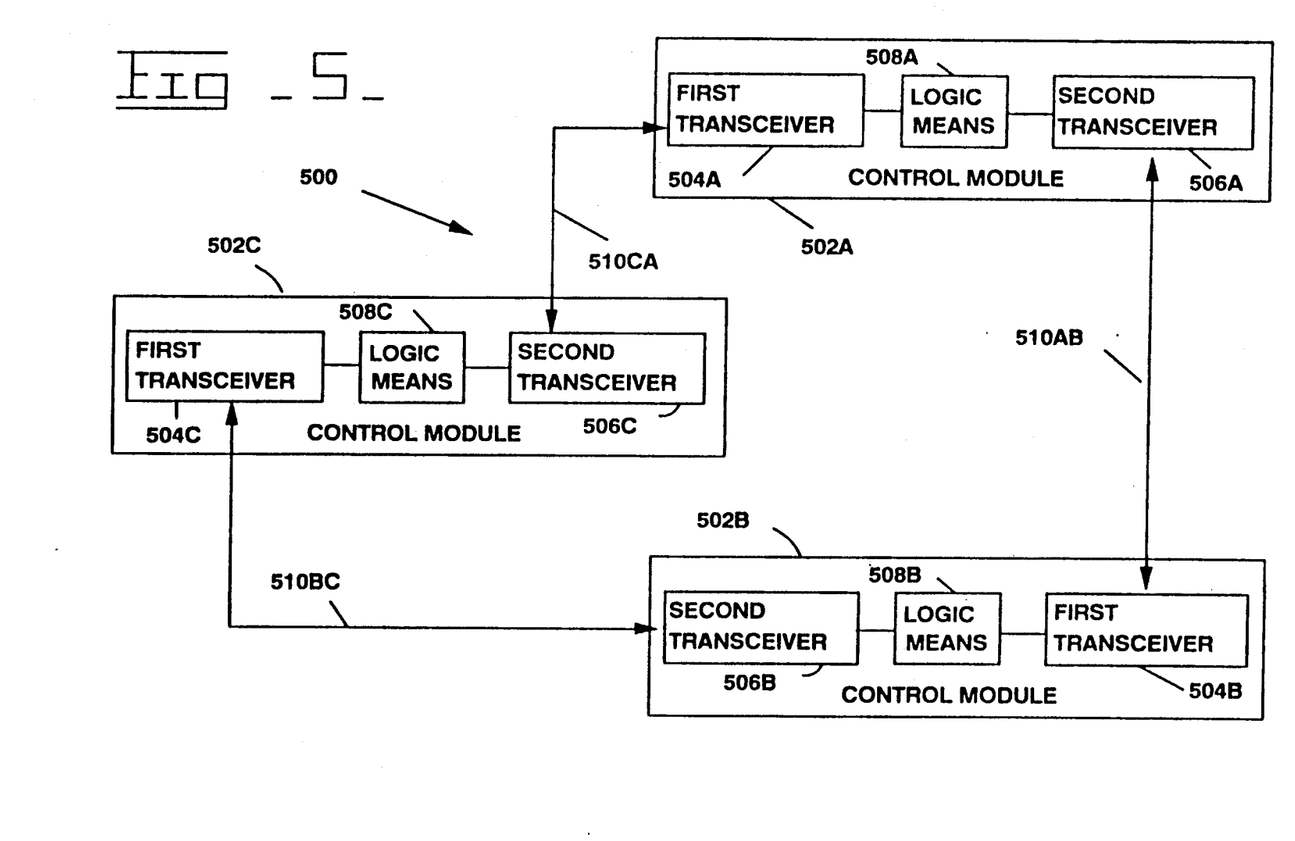
FIG. 5 is a block diagram of a communications network having a plurality of control modules in a ring network, each having a pair of transceivers.

With reference to FIG. 5, the present invention is adapted to provide communication between three control modules 502A, 502B, 502C connected in a network 500 on a vehicle (not shown). Each control module 502A, 502B, 502C has a first transceiver (transmitter/receiver pair) 504A, 504B, 504C and a second transceiver 506A, 506B, 506C. The control modules 502A, 502B, 502C may have varying functions, which are immaterial to the present invention. The control modules 502A, 502B, 502C include logic means 508A, 508B, 508C which generate and receive data messages. The data messages generated by one control module 502A, 502B, 502C are transmitted to the other control modules 502A, 502B, 502C by the first and second transceivers 504A, 506A, 504B, 506B, 504C, 506C. The control modules 502A, 502B, 502C are connected in a ring with the first transceiver 504A, 504B, 504C of each control module 502A, 502B, 502C connected to the second transceiver 506A, 506B, 506C of the previous control module 502A, 502B, 502C in the network 500 and the second transceiver 506A, 506B, 506C of each control module 502A, 502B, 502C connected to the first transceiver 504A, 504B, 504C of the next control module 502A, 502B, 502C in the network 500. A single transmission line 510AB, 510BC, 510CA connects each first transceiver 504A, 504B, 504C to the respective second transceiver 506A, 506B, 506C. The transmission lines 510AB, 510BC, 510CA, in the preferred embodiment, are twisted wire pairs.

The data messages are fixed format serial bit streams. Each data message begins with a Message Identification (MID) character; followed by one or more parameters. Each parameter begins with a Parameter Identification (PID) character followed by one or more parameter data characters. The data message ends with a checksum character. Each character has a start bit, 8 bits of data, and a stop bit. Alternately, the Mid character could be replaced by a Source Identification (SID) character and a Destination Identification (DID) character.

Figure 6:
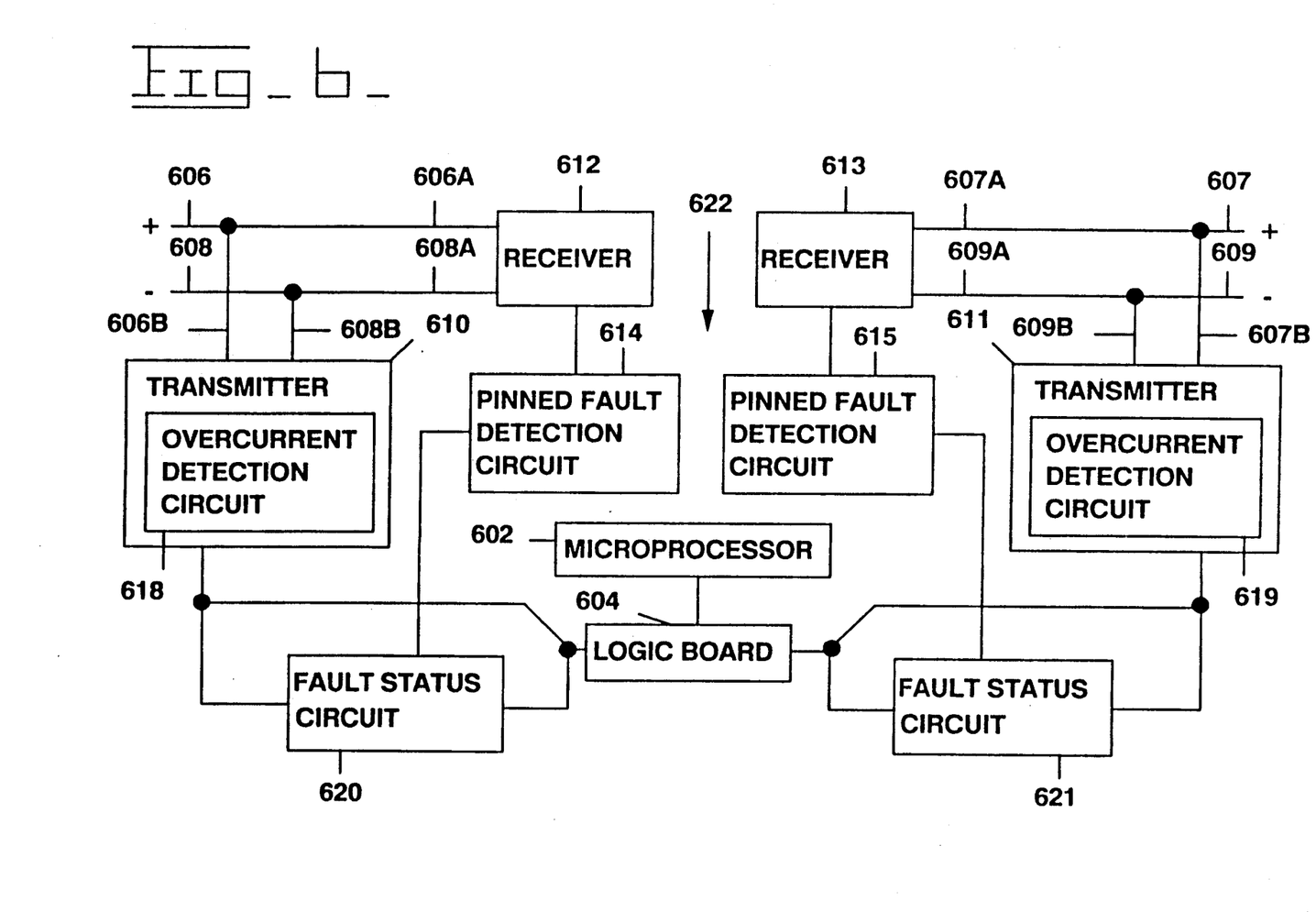
FIG. 6 is a block diagram of one control module of FIG. having a microprocessor and a logic board.

With reference to FIG. 6, a functional block diagram of one logic means 508 is shown. The logic means 508 includes a microprocessor 602 and a logic board 604. The first and second transceivers 504, 506 are shown as separate first and second transmitters 610, 611 and first and second receivers 612, 613. In the preferred embodiment, the microprocessor 602 is adapted to perform a complex function, for example, controlling the solenoids of a fuel injection engine. The microprocessor 602 may receive information from a variety of sensors (not shown) to perform its specified function. The logic board 604 controls the flow of data messages to and from the microprocessor 602.

With reference to one control module 502, the transmission line 510 connected to the first receiver 612 includes a first positive transmission wire 606 and a first negative transmission wire 608. The transmission line 510 connected to the second transceiver 504 includes a second positive transmission wire 607 and a second negative transmission wire 609. Logic level "HI" is defined to exist when there is a positive 0.2 voltage differential between the positive transmission wire 606, 607 and the negative transmission wire 608, 609. A logic level "LO" is defined to exist when there exists a negative 0.2 voltage differential between the positive transmission wire 606, 607 and the negative transmission wire 608, 609. The positive and negative transmission wires 606, 607, 608, 609 form a pair of balanced transmission wires, i.e., the line drivers and receivers are constructed such that the wires in each transmission pair have matched impedances. A second feature of the transmission lines 510 is that the currents in the positive and negative transmission wires 606, 607, 608, 609 are substantially equal in magnitude and opposite in direction.

A second convention used is that the idle or inactive state of the transmission lines 510 is logic level "HI" (the IDLE state). In addition, the first and second transceivers 504, 506 are designed such that a logic "LO" signal dominates, i.e., if two transceivers 504, 506 are attempting to transmit on a transmission line 510 at the same time, the transmission line 510 always assumes the "LO" state any time either transceiver 504, 506 transmits a "LO". Logic level "LO" is therefore said to be the DOMINANT state. In order for one control module 502A, 502B, 502C to properly detect the start of data messages transmitted from another control module 502A, 502B, 502C, it is therefore necessary that the first or start bit of each data character is a logic level "LO".

A short circuit detecting means 622 detects the presence of short circuit conditions on the transmission lines 510AB, 510BC, 510CA. First and second pinned fault detection means 614, 615 associated with the first and second receivers 612, 613, respectively, sense when the respective transmission line 510 is shorted in the DOMINANT state, i.e., the positive transmission wire 606 is shorted to electrical ground or the negative transmission wire 608 is shorted to supply voltage.

First and second overcurrent detection means 618, 619 protect the control module 502 from large currents on the positive and negative transmission wires 606, 608, 607, 609, i.e., the positive transmission wire 606, 607 is shorted to supply voltage, the negative transmission wire 608, 609 is shorted to electrical ground, or the positive and negative transmission wires 606, 608, 607, 609 are shorted together. Fault status circuits 621, 622 relay the presence of a pinned fault or overcurrent condition to the logic board 604.

Figure 7:
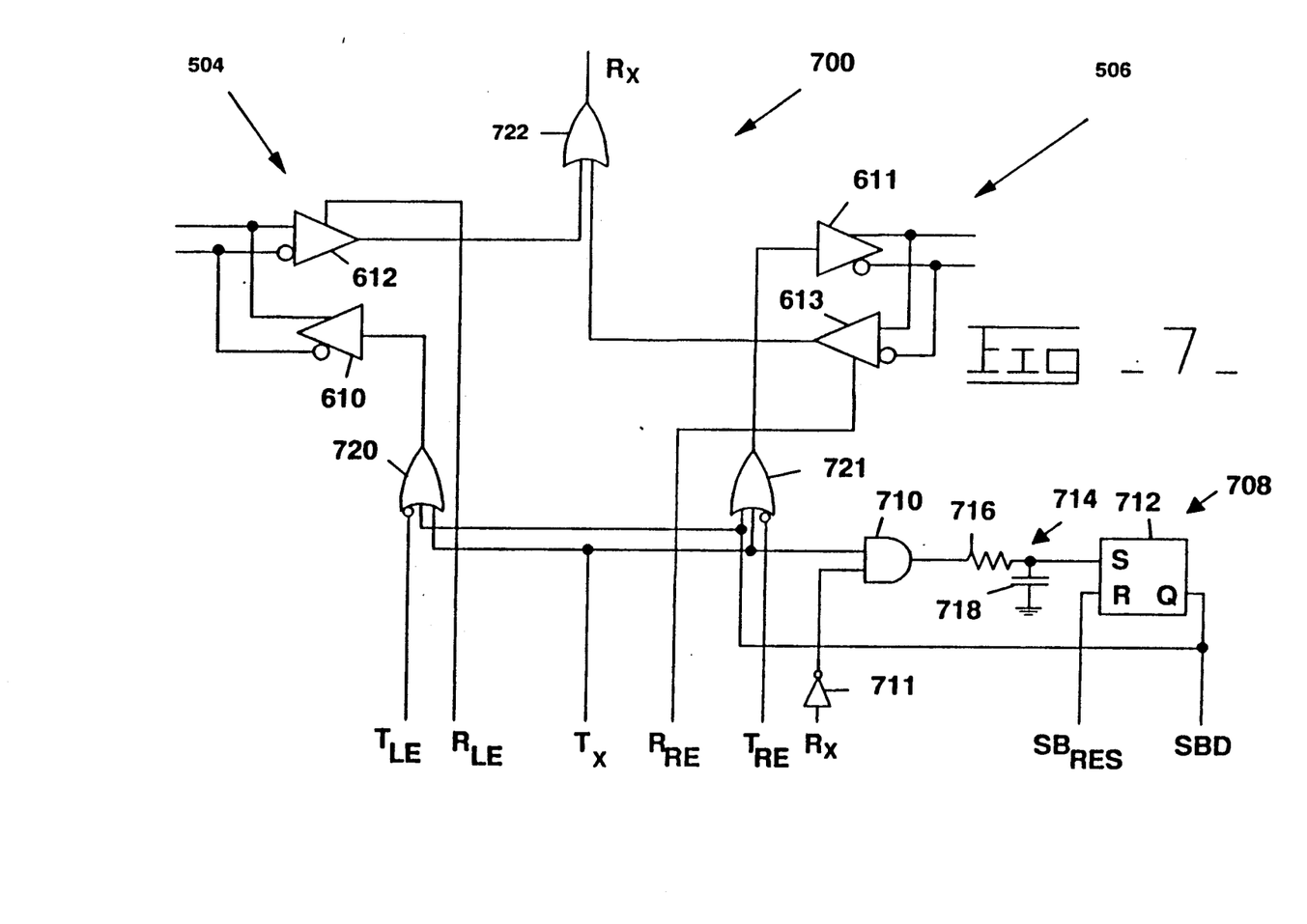
FIG. 7 is a functional logic diagram of the logic module of FIG. 4.

With reference to FIG. 7, the basic digital logic circuit 700 found on the logic board 504 is shown. Serial data to be transmitted is received from the microprocessor 602 (shown as signal $T_X$) and passed to the first and second transmitters 610, 611 through second and third logic gates 720, 721. The output of the first and second receivers 612, 613 is relayed to the microprocessor 602 though a fourth logic gate 722 (signal $R_X$).

The logic circuit 700 includes a means 708 for detecting if a data message is present on the transmission line 510. Signal $R_X$ is connected to a first logic gate 710 through an inverter 711. The first logic gate 710 compares the signals $R_X$ and $T_X$ and is connected to a flip-flop 712 by a lowpass filter 714. The lowpass filter 714 includes a resistor 716 and a capacitor 718. The flip-flop 712 is connected to the microprocessor 602 and signals the microprocessor 602 when a data message from another control module 502 is being received (signal SBD). The microprocessor 602 resets the flip-flop 712 by signal $SB_{RES}$.

The microprocessor 602 controls the first and second transceivers 504, 506 through the logic circuit 700 by signals $T_{LE}$, $R_{LE}$, $T_{RE}$, $R_{RE}$. Through these signals, the microprocessor 602 can disable either transmitter 610, 611 (signals $T_{LE}$, $T_{RE}$) and/or either receiver 612, 613 ($R_{LE}$, $R_{RE}$).

When no data messages are being transmitted or received by any control module 502, both transmission lines 510 are in the passive or "HI" state, as described above. If a control module 502 needs to transmit a data message, the microprocessor 602 checks signal SBD. The microprocessor 602 delays transmission of the data message for a period of time equal to an idle time period plus a priority time period after the detecting means 708 detects the absence of another data message. Preferably, the idle time period is equal to the time required to transmit a character of data, i.e., ten bit times. The priority time period is different for each module and prioritizes each module such that, after the transmission of a data message, no module will attempt to transmit simultaneously. Then the control module 502 attempts to transmit the data message simultaneously in both directions through the first and second transceivers 504, 506.

Figure 8A:
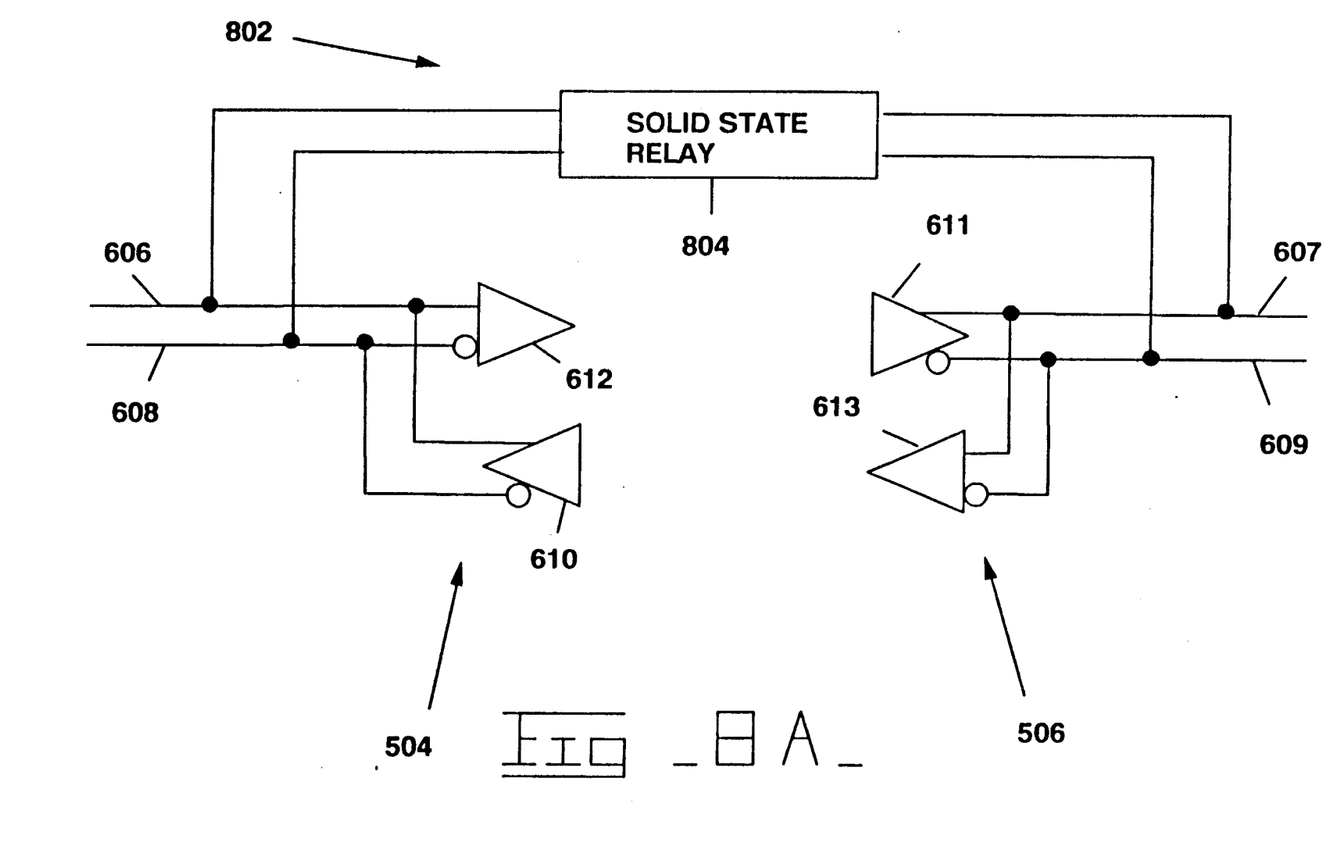
FIG. 8A is a block diagram of the transceivers of one control module showing a first embodiment of a pass-through means.
Figure 8B:
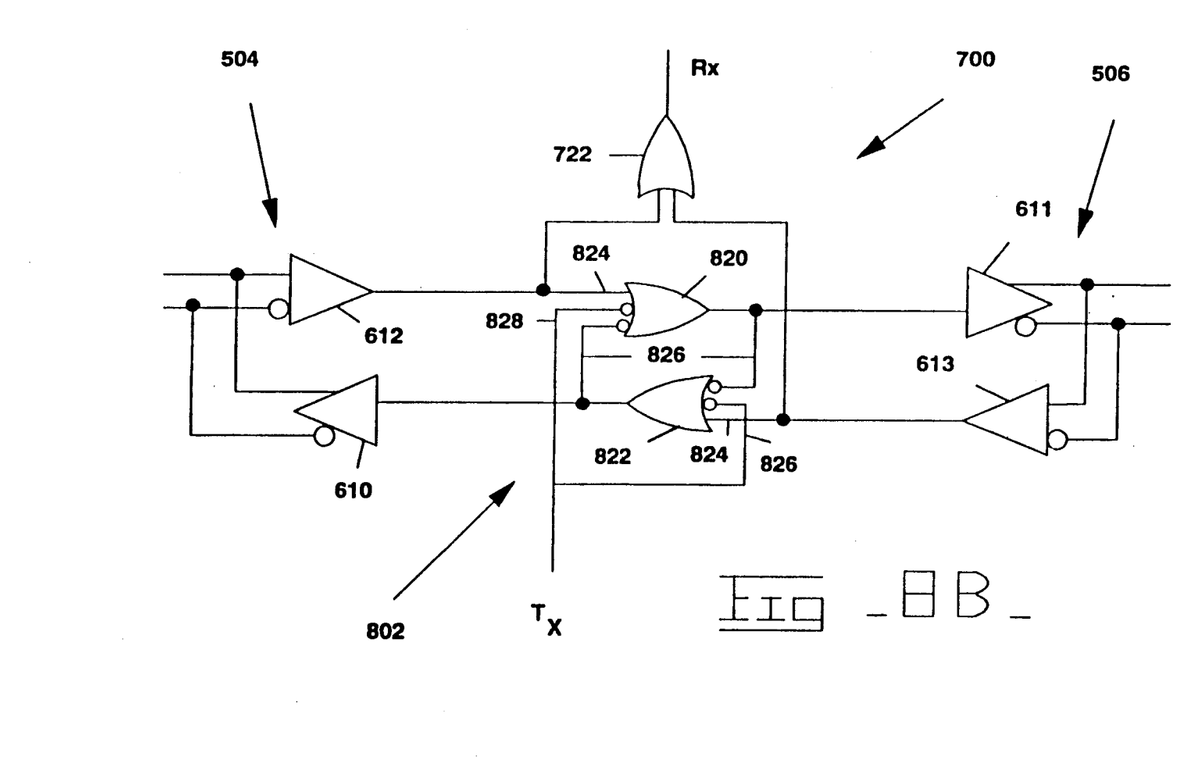
FIG. 8B is a block diagram of the transceivers of one control module showing a second embodiment of the pass-through means.

Referring to FIGS. 8A and 8B, a data message received by either the first or second receiver 612, 613 of one control module 502 is relayed to the next control module 502 by a pass-through means 802. In this way, the data message is propagated from control module 502 to control module 502.

In one embodiment, the pass through means 802 includes a solid state relay 804, as shown in FIG. 8A. One suitable relay, part no. LH1061AB, is available from AT&T Technologies INC, a subsidiary of American Telephone & Telegraph CO, located in Berkeley Hts, N.J. The relay 804 is connected across the control module 502 and is under the control of the microprocessor 602. The relay 804 is normally in the closed state, such that the first positive transmission wire 606 is electrically connected to the second positive transmission wire 607. The same is true for the first and second negative transmission wires 608, 609.

A second embodiment of the pass-through means 802 is illustrated in FIG. 8B. First and second pass-through gates 820, 822 are connected between the first and second transceivers 504, 506. A noninverting input 824 of the first pass-through gate 820 is connected to the output of the first receiver 612. The output of the first pass-through gate 820 is connected to the second transmitter 611. A noninverting input 824 of the second pass-through gate 822 is connected to the output of the second receiver 613. The output of the second pass-through gate 822 is connected to the first transmitter 610. Thus, data messages received by the first transceiver 504 are retransmitted to the next control module 502 by the second transceiver 506. The reverse also holds true.

The first and second pass-through gates 820, 822 have first and second inverting inputs 826, 828 so that "latch-up" will not occur. "Latch-up" is the situation when the first and second transceivers 504, 506 become nonresponsive to subsequent signals after a "LO" (the DOMINANT state) has been received or transmitted.

For example, when a "LO" is received by the first transceiver 504, the output of the first receiver 612 and the first pass-through gate 820 both go "LO". The second transceiver 506 retransmits the "LO" to the next control module 502. If the second receiver 613 is allowed to relay the "LO" back to the first transmitter 610, the first transmitter 610 will retransmit the "LO" and the first receiver 612 will be nonresponsive when the transmission line 510 attempts to go "HI". To prevent the retransmitted "LO" from being relayed back to the first transmitter 610, the output of the first pass-through gate 820 is connected to the inverting input 826 of the second pass-through gate 822. The output of the second pass-through gate 822 is "HI", and therefore the first transmitter 610 becomes nonresponsive to the second receiver 613. A received "LO" by the second transceiver 506 is handled in a similar manner and is therefore not further discussed.

During transmission of a data message originating at the control module 502, "latch-up" must also be prevented. For that purpose, the signal $T_X$ is applied to the second inverting input 828 of the first and second pass-through gates 820, 822. When $T_X$ goes "LO", the outputs of the first and second pass-through gates 820, 822 go "HI". Therefore, the pass-through gates 820, 822 are nonresponsive to any signal from the first and second receivers 612, 613.

While the above discussion applies the present invention to a bidirectional single line ring network as disclosed in copending U.S. Patent Application, entitled Fault Tolerant Serial Communications Network, filed concurrently with this application, it is recognized that the present invention can be applied to a serial bus, a serial ring bus or a unidirectional ring network. The present invention is therefore not limited to such an application.

Figure 9:
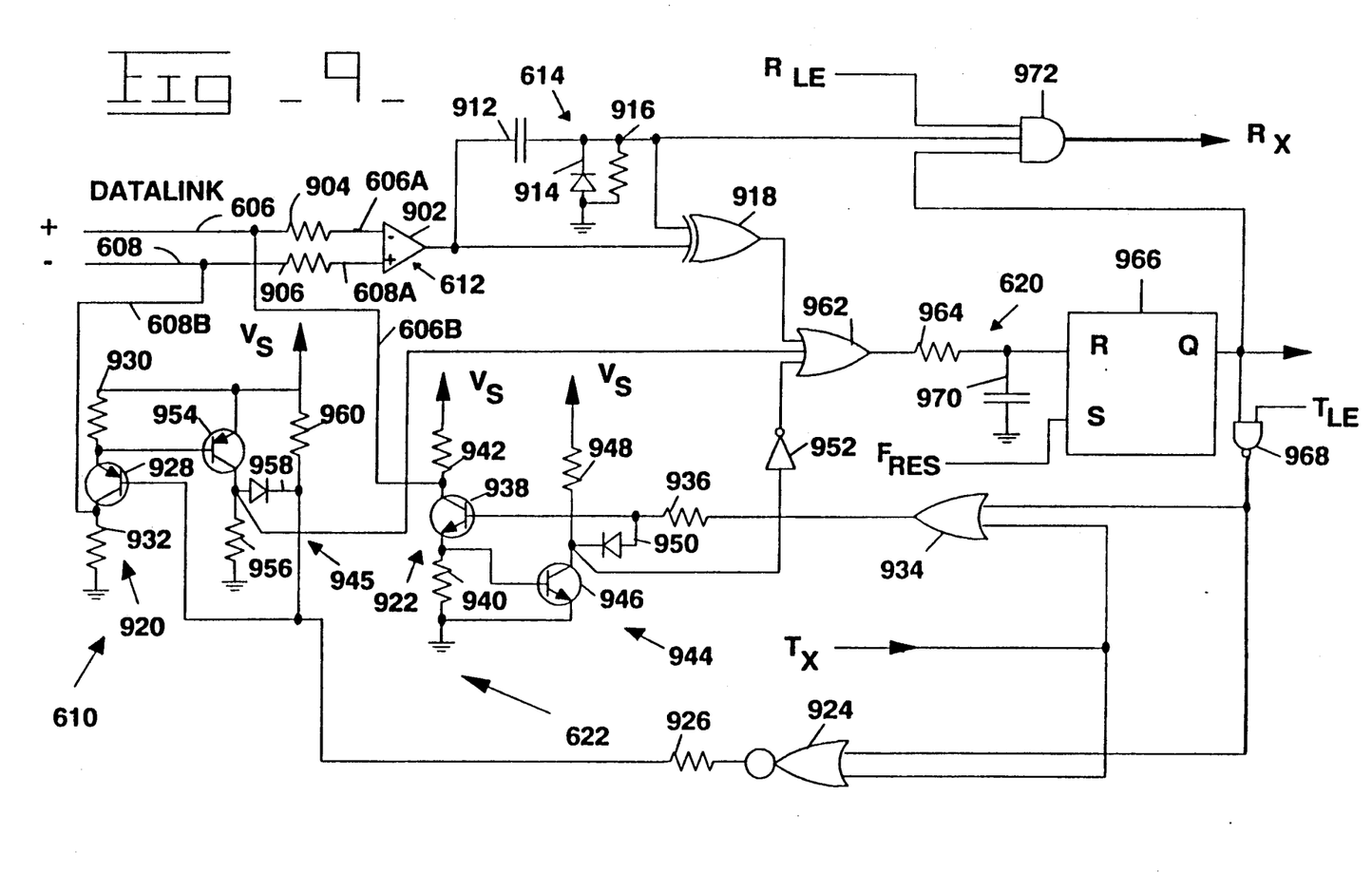
FIG. 9 is an electrical schematic of the transceiver and fault diagnostic hardware according to the present invention.

With reference to FIG. 9, an electrical schematic of the first receiver 612, the first transmitter 610, the first pinned fault detection means 614, the first overcurrent detection means 618, and the first fault status circuit 620 is shown. The schematic for the second receiver 613, the second transmitter 611, the second pinned fault detection means 615, and the second fault status circuit 621 is identical and is therefore not further described. The first receiver 612 includes a differential receiver 902. The first positive and negative transmission wires 606, 608 are connected to the negative and positive input terminals of the differential receiver 902 through a first resistor 904 and a first positive receiving wire 606A connected in series, and through a second resistor 906 and a first negative receiving wire 608A, respectively. The output of the differential receiver 902 is the complement of the logic state on the transmission line 510, i.e., "HI" or "LO".

The pinned fault detection means 614 includes a first capacitor 912 connected to the output of the differential receiver 902 at one end and to the fourth logic gate 722 at the other end. The juncture between the first capacitor 912 and the fourth logic gate 722 is connected to ground by a first diode 914 and a fifth resistor 916 connected in parallel. The juncture is also connected to an input of a fifth logic gate 918. A second input of the fifth logic gate 918 is connected to the output of the differential receiver 902.

The transmitter 610, in the preferred embodiment, has a negative line driver 920 and a positive line driver 922. The negative line driver 920 includes a sixth logic gate 924. The sixth logic gate 924 receives signal $T_X$. A sixth resistor 926 is connected to the output of the sixth logic gate 924 at one end and to the base of a first PNP transistor 928 at the other end. The emitter of the first PNP transistor 928 is connected to the voltage supply, $V_S$, through a seventh resistor 930. The collector of the first PNP transistor 928 is connected to electrical ground through an eighth resistor 932 and is also connected to the first negative transmission wire 608 through a first negative transmitting wire 608B.

The positive line driver 922 includes a seventh logic gate 934. An input of the seventh logic gate 934 receives signal $T_X$. A ninth resistor 936 is connected to the output of the seventh logic gate 934 at one end and to the base of a first NPN transistor 938 at the other end. The emitter of the first NPN transistor 938 is connected to electrical ground by a tenth resistor 940. An eleventh resistor 942 connects the collector of the first NPN transistor 938 to the voltage supply, $V_S$. The collector of the first NPN transistor 938 is also connected to the first positive transmission wire 606 through a first positive transmitting wire 606B.

The first overcurrent detection means 618 includes a positive overcurrent detection circuit 944 and a negative overcurrent detection circuit 945. The positive overcurrent detection circuit 944 includes a second NPN transistor 946, the base of which is connected to the emitter of the first NPN transistor 938 and the emitter of the second NPN transistor 946 is connected to electrical ground. A twelfth resistor 948 connects the collector of the second NPN transistor 946 to the voltage supply, $V_S$. A second diode 950 is connected between the base of the first NPN transistor 938 and the collector of the second NPN transistor 946. The collector of the second NPN transistor 946 is also connected to an eighth logic gate 952. The negative overcurrent detection circuit 945 includes a second PNP transistor 954, the base of which is connected to the emitter of the first PNP transistor 928 and the emitter of the second PNP transistor 954 is connected to the voltage supply, $V_S$. A thirteenth resistor 956 connects the collector of the second PNP transistor 954 to electrical ground. A third diode 958 connects the collector of the second PNP transistor 954 to the base of the first PNP transistor 928. A fourteenth resistor 960 connects the cathode of the third diode 958 to the voltage supply, $V_S$.

The first fault status circuit 620 includes a logic gate 962. An input of the logic gate 962 is connected to the output of the fifth logic gate 918. A second input of the logic gate 962 is connected to the collector of the second PNP transistor 954 and a third input of the logic gate 962 is connected to the collector of the second NPN transistor 946 through the eighth logic gate 952. A fifteenth resistor 964 is connected between the output of the logic gate 962 and the Reset terminal of a flip-flop 966. A second capacitor 970 connects the Reset terminal of the flip-flop 966 to electrical ground. The flip-flop 966 is under the control of the microprocessor 602 through the Set terminal (signal $F_{RES}$). The output terminal, Q, of the flip-flop 966 is connected to the microprocessor 602 and to the sixth and seventh logic gates 924, 934 through a logic gate 968. The tenth logic gate is also responsive to the signal $T_{LE}$. An eleventh logic gate 972 is connected to the pinned fault detection means 614, the flip-flop 966, and signal $R_{LE}$.

INDUSTRIAL APPLICABILITY

With reference to the drawings, and in operation the network 500 is adapted for communication between three control modules 502A, 502B, 502C on an earthmoving vehicle, for example, an excavator or a wheel loader, not shown. The control modules 502A, 502B, 503C have varying functions. These control modules 502A, 502B, 50C periodically generate data messages which may be needed by one or more of the other control modules 502A, 502B, 502C. If no data message is being transmitted by any control module 502, all transmission lines 510 are in the passive or logic level "HI" state.

For example in a typical embodiment, one control module 502A controls the fuel injection of the vehicle's engine. The second control module 502B controls the actuation of the clutches and brakes in an electrohydraulic transmission. The third control module 502C controls the movement/position of the implement, i.e., bucket.

The control modules 502A, 502B, 502C need to communicate to perform their assigned tasks. The first control module 502A includes a sensor for monitoring the engine's RPM. The second control module 502B may also require the engine's RPM to determine a desired gear ratio. Therefore, the first control module 502A needs to periodically transmit the engine's RPM to the second control module 502B.

To accomplish this, the first control module 502A checks if either of the other control modules 502B, 502C is transmitting a data message. This is accomplished through the detecting means 708. The first logic gate 710 compares the signals, $R_X$ and $T_X$. Since no message is being transmitted by the first control module 502A, signal $T_X$ is "HI", the passive state. Therefore the output of the first logic gate 710 will be "HI" only if signal $R_X$ is "LO" (i.e., the second or third control module 502B, 502C is transmitting a data message). The lowpass filter 714 eliminates any high frequency transients in the output of the first logic gate 710. When the output of the first logic gate 710 goes "HI", the flip-flop 712 will be "set", i.e., the flip-flop's output, Q, and signal SBD go "HI". After signal SBD goes "HI", the microprocessor 602 of the first control module 502A delays transmission of the data message containing the engine's RPM for a period of time greater than the time required to transmit one character of data (discussed above). At that time, the first control module 502A will try to transmit the data message again, until it is successful, i.e., the other control module 502B, 503C is done transmitting.

While the first control module 502A is transmitting its data message, the second control module 502B receives the data message from the first transceiver 504B and passes the data message to the third control module 502C by the pass-through means 802, as described above. The data message is also transmitted in the other direction by the first transceiver 504A of the first control module 502A. The second transceiver 506C of the third control module 502C receives the data message and passes the data message to the second control module 502B. The second and third control modules 502B, 502C also decode the data and determine if the data is intended for them through the Message Identification character (MID).

The chance occurrence that two control modules 502A, 502B, 502C will transmit data messages simultaneously is also eliminated by the detecting means 708. The first logic gate 710 compares the transmitted signal and the received signal, $T_X$ and $R_X$. The detecting means 708 signals the microprocessor 602 when the signals are not the same. For example, if the first and second control modules 502A, 502B begin to transmit data messages at the same time, both will continue to transmit as long as $T_X$ and $R_X$ are the same. However, if the first control module 502A attempts to transmit a "HI" while the second control module 502B is transmitting a "LO", the microprocessor 602 of the first control module 502A will halt transmission of its data message and wait in the same manner as described above. Signal SBD is also fed into the second and third logic gates 720, 721 to disable the first and second transmitters 610, 611 of the first control module 502A. Since the "HI" transmitted by the first control module 502A is the passive state of the transmission lines, the transmission lines will assume the "LO" being transmitted by the second control modules 502B. Therefore, the second control module 502B can continue to transmit its data message because the integrity of its transmission has not been interrupted.

If the first differential receiver 902 is receiving valid data, the output of the differential receiver 902 is the logic complement of the state of the transmission line 510 (an additional logic gate can invert this signal before it reaches the microprocessor 602 or the microprocessor 602 can invert the data). Since the voltage potential across the capacitor 912 cannot change instantaneously, the voltage across the fifth resistor 916 follows the output of the differential receiver 620. If the positive and negative transmission wires 606, 608 are shorted in the DOMINANT state, the output of the differential receiver 612 remains "HI" for a period of time great enough to charge the first capacitor 912. The voltage potential across the fifth resistor 916 will fall as the voltage potential across the first capacitor 912 rises. Therefore the inputs of the fifth logic gate 918 will be opposite and the output of the fifth logic gate 918 will go "HI", triggering the first fault status circuit 620.

The first overcurrent detection means 618 includes the positive overcurrent detection circuit 944 and the negative overcurrent detection circuit 945, as described above. If the positive transmission wire 606 is shorted to the supply voltage $V_S$, the magnitude of the current flowing through the tenth resistor 940 increases. The voltage potential across the tenth resistor 940 is linearly proportional to the magnitude of the current flowing through the tenth resistor 940. When the voltage potential across the tenth resistor 940 reaches a predetermined value, the second NPN transistor 946 switches to the conducting state and the voltage potential across the twelfth resistor 948 increases. The input of the eighth logic gate 952 becomes low, triggering the first fault status circuit 620. If the negative transmission wire 608 is shorted to electrical ground, the magnitude of the current flowing through the seventh resistor 930 increases. The voltage potential across the seventh resistor 930 is linearly proportional to the magnitude of the current flowing through the seventh resistor 930. When the voltage potential across the seventh resistor 930 reaches a predetermined value, the second PNP transistor 954 switches to the conducting state and the voltage potential across the thirteenth resistor 956 increases, triggering the first fault status circuit 620. If the first positive and negative transmission wires 606, 608 are shorted together one or both of the positive and negative overcurrent detection circuits 944, 945 will trigger the first fault status circuit 620.

In this manner, the first fault status circuit 620 relays to the microprocessor 602 the presence of a short circuit on the first positive and negative transmission wires 606, 608. The microprocessor 602 protects the circuit by disabling the first receiver 612 and the first positive and negative line drivers 920, 922 (signals $T_{LE}$, $R_{LE}$). The second receiver 613 and the second positive and negative line drivers 921, 923 in the control module 502A, 502B, 502C on the other side shorted transmission wires 606, 608 are disabled in the same manner. Data messages are transmitted around the network 500 in the other direction, bypassing the disabled receivers/transmitters 612, 613, 920, 921, 922, 923.

Transmission between all of the control modules 502A, 502B, 502C can also be accomplished when a break occurs in the transmission line 510AB, 510BC, 510CA between two of the control modules 502A, 502B, 502C. The receivers/transmitters 612, 613, 920, 921, 922, 923 associated with the faulted transmission line 510AB, 510BC, 510CA are disabled and data messages are transmitted around the network in the other direction, bypassing the disabled receivers/transmitters 612, 613, 920, 921, 922, 923. The presence and location of the broken transmission line 510AB, 510BC, 510CA is determined in the following manner. The first control module 502A (the assignment of this function is arbitrary) periodically disables the first transmitter 610 and transmits a data message around the network in one direction using the second transmitter 611. If the data message returns to the first control module 502A and is received by the first receiver 612, then no break has occurred. If the data message does not return, a break in one of the transmission lines 510AB, 510BC, 510CA has occurred. Then the first control module 502A requests that every other control module 502B, 502C transmit a data message in turn. By monitoring if the data message transmitted by each control module 502B, 502C is received by the first or second transceiver 504, 506, the location of the break can be determined. For example, if a break occurs between the first and second control modules 502A, 502B, the data message transmitted by the second control module 502B AND the data message transmitted by the third control module 502C will both be received by the second transceiver 504A of the the first control module.

A display (not shown) on the vehicle may indicate to an operator that a fault has occurred and the location of the fault. The outputs of the first and second pinned fault detection means 614, 615, and the first positive and negative overcurrent detection circuits may be connected to the microprocessor 602, such that the microprocessor 602 can determine not only the presence and location of a fault, but also the type of fault present on the transmission lines 510AB, 510BC, 510CA.

I claim:

1. An apparatus for providing fault tolerant serial communications in a network, said network having a plurality of control modules connected one to another, wherein said network is adapted to transmit data messages from one control module to another control module, comprising:
   - a first differential receiver having positive and negative input terminals and an output terminal, said negative input terminal being connected to a first positive receiving wire, said positive input terminal being connected to a first negative receiving wire and said output terminal being connected to said one control module;
   - means for sensing a short circuit condition between said first positive receiving wire and ground and sensing a short circuit condition between said first negative receiving wire and supply voltage, and delivering a first fault signal in response to either of said sensed conditions;
   - a first transmitter having a first positive line driver connected between said one control module and a first positive transmitting wire and a first negative line driver connected between said one control module and a first negative transmitting wire;
   - means for sensing the magnitude of current flowing through said first positive transmitting wire, comparing said first positive transmitting wire current magnitude to a first reference current value, and delivering a second fault signal in response to said first positive transmitting wire current magnitude being greater than said first reference current value, and for sensing the magnitude of current flowing through said first negative transmitting wire, comparing said first negative transmitting wire current magnitude to a second reference current value, and delivering a third fault signal in response to said first negative transmitting wire current magnitude being greater than said second reference current, and;
   - means for receiving said first fault signal and disabling said first differential receiver in response thereto, receiving said second fault signal and disabling said first positive line driver in response thereto, and receiving said third fault signal and disabling said first negative line driver in response thereto.

2. An apparatus as set forth in claim 1, wherein said first differential receiver of said one control module is connected to the first transmitter of a previous control module, and said first transmitter of said one control module is connected the first differential receiver of a next control module, forming a ring.

3. An apparatus as set forth in claim 2, including:
   - a second differential receiver having positive and negative input terminals and an output terminal, said negative input terminal being connected to a second positive receiving wire, said positive input terminal being connected to a second negative receiving wire, and said output terminal being connected to said one control module;
   - means for sensing a short circuit condition between said second positive receiving wire and ground and sensing a short circuit condition between said second negative receiving wire and supply voltage, and delivering a fourth fault signal in response to either of sensed conditions;
   - a second transmitter having a second positive line driver connected between said one control module and a second positive transmitting wire and a second negative line driver connected between said one control module and a second negative transmitting wire,
   - means for sensing the magnitude of current flowing through said second positive transmitting wire, comparing said second positive transmitting wire current magnitude to a third reference current value, and delivering a fifth fault signal in response to said second positive transmission wire current magnitude being greater than said third reference current value, and for sensing the magnitude of current flowing through said second negative transmitting wire, comparing said second negative transmitting wire current magnitude to a fourth reference current value, and delivering a sixth fault signal in response to said second negative transmitting wire current magnitude being greater than said fourth reference current; and,
   - means for receiving said fourth fault signal and disabling said second differential receiver in response thereto, receiving said fifth fault signal and disabling said second positive line driver of said second transmitter in response thereto, and receiving said sixth fault signal and disabling said negative line driver of said second transmitter in response thereto.

4. An apparatus as set forth in claim 3, wherein said second differential receiver of said one control module is connected to the second transmitter of said next control module, and said second transmitter of said one control module is connected to said second differential receiver of said previous control module, forming a second ring.

5. A method for providing fault tolerant serial communications in a network, said network having a plurality of control modules connected one to another, wherein said network is adapted to transmit data messages from one control module to another control module over positive and negative transmission wires, comprising:
   - transmitting a data message from said one control module to said another control module over said positive and negative transmission wires;
   - sensing the current flowing through said positive and negative transmission wires as a voltage differential between said positive and negative transmission wires;

delivering said data message to said another control module as a function of said voltage differential;

sensing a short circuit condition between said positive transmission wire and ground, sensing a short circuit condition between said negative transmission wire and supply voltage, and delivering a first fault signal in response to either of said sensed conditions;

sensing the magnitude of current flowing through said positive transmission wire, comparing said positive transmission wire current magnitude to a first reference current value, and delivering a second fault signal in response to said positive transmission wire current magnitude being greater than said first reference current value;

sensing the magnitude of current flowing through said negative transmission wire, comparing said negative transmission wire current magnitude to a second reference current value, and delivering a third fault signal in response to said negative transmission wire current magnitude being greater than said second reference current; and, receiving said first, second, and third fault signals and isolating said control modules from said positive and negative transmission wires in response to said fault signals.

* * * * *